(12) United States Patent
Steenwinkel et al.

(10) Patent No.: US 7,217,400 B2
(45) Date of Patent: May 15, 2007

(54) PREPARATION OF IRON COMPOUNDS BY HYDROTHERMAL CONVERSION

(75) Inventors: Edgar Evert Steenwinkel, Haarlem (NL); Johannes Petrus Jozef Verlaan, Deventer (NL); Marieke Paulyne Renate Spee, Utrecht (NL); Erik Jeroen Laheij, Amsterdam (NL); Paul O'Connor, Hoevelaken (NL); Dennis Stamires, Newport Beach, CA (US)

(73) Assignee: Albemarle Netherlands B.V., Amersfoort (NL)

( * ) Notice: Subject to any disclaimer, the term of this patent is extended or adjusted under 35 U.S.C. 154(b) by 361 days.

(21) Appl. No.: 10/642,893

(22) Filed: Aug. 18, 2003

(65) Prior Publication Data

US 2004/0096380 A1    May 20, 2004

(30) Foreign Application Priority Data

Aug. 16, 2002    (EP) ................... 02078407

(51) Int. Cl.
*C01G 1/00*    (2006.01)
*C01G 49/00*    (2006.01)
(52) U.S. Cl. ............... 423/138; 423/150.1; 423/632; 423/633; 423/658.5; 23/305 F
(58) Field of Classification Search .............. 423/138, 423/150.1, 632, 633, 658.5; 23/305 F
See application file for complete search history.

(56) References Cited

U.S. PATENT DOCUMENTS

| | | | |
|---|---|---|---|
| 3,539,337 A | 11/1970 | Stanimirovitch et al. ..... 75/108 |
| 3,910,784 A * | 10/1975 | Rastas ......................... 423/109 |
| 3,969,494 A | 7/1976 | Nobuoka et al. ............ 423/633 |
| 4,006,090 A | 2/1977 | Beck ........................ 252/62.56 |
| 4,289,746 A * | 9/1981 | Hayakawa et al. ......... 423/633 |
| 4,339,425 A * | 7/1982 | Tokuoka ..................... 423/633 |
| 4,631,089 A * | 12/1986 | Rademachers et al. ..... 106/456 |
| 4,696,807 A | 9/1987 | Chu et al. ................... 423/305 |
| 5,652,192 A | 7/1997 | Matson et al. .............. 502/304 |

FOREIGN PATENT DOCUMENTS

| | | |
|---|---|---|
| DE | 294468 | 10/1991 |
| EP | 0226258 | 6/1987 |
| EP | 0231860 | 9/1993 |
| RO | 86979 | 5/1985 |
| RO | 100113 | 3/1991 |
| WO | WO 94/01361 | 1/1994 |

OTHER PUBLICATIONS

Abstract of Romanian Patent 107,843, Jan. 31, 1994.
Abstract of Romanian Patent 109729, May 30, 1995.
Abstract of Romanian Patent 90697, Jan. 30, 1987.
Abstract of Japanese Patent JP63-232843, Sep. 28, 1988.
Abstract of Japanese Patent JP62-004805, Jan. 10, 1987.

(Continued)

*Primary Examiner*—Timothy C. Vanoy
(74) *Attorney, Agent, or Firm*—Frank C. Eymard

(57) ABSTRACT

An apparatus and continuous process for the conversion of one solid iron compound to another solid iron compound in a heterogeneous suspension wherein the suspension is formed by dispersing a solid starting iron compound in a liquid that is continuously fed through one or more agitated conversion vessels under hydrothermal conditions and converted to a solid product iron compound having different physical, chemical, or structural properties from the solid starting iron compound.

23 Claims, 1 Drawing Sheet

OTHER PUBLICATIONS

Computer Translation of JP06064927.
Abstract of JP06064927.
Diamandescu L., et al, Hydrothermal Synthsis and Characterizationof Some Polycrystalline alpha-iron oxides, Ceramics International, GB, vol. 25, No. 8, Dec. 1999, pp. 689-692 <<Abstract of JP06064927.

European Search Report of Corresponding EP Patent Application No. EP02078407.
Abstract of JP63064925, Mar. 23, 1988.
International Search Report of corresponding PCT Application No. PCT/EP03/09032, Dated Nov. 25, 2003.

* cited by examiner

PREPARATION OF IRON COMPOUNDS BY HYDROTHERMAL CONVERSION

CROSS REFERENCE TO RELATED APPLICATIONS

This application claims priority from European Patent Application No. 02078407.0, filed Aug. 16, 2002.

BACKGROUND OF THE INVENTION

1. Field of the Invention

The present invention relates to a process for the hydrothermal conversion of a solid starting iron compound selected from the group consisting of iron oxides, iron hydroxides, iron oxyhydroxides, and mixtures thereof into a solid product iron compound, the solid product iron compound having different physical, chemical, and/or structural properties from the solid starting iron compound.

2. Prior Art

It is known from the prior art to convert goethite (alpha-FeOOH) into hematite (alpha-$Fe_2O_3$) in a suspension under hydrothermal conditions. Romanian Patent Application RO 86979 discloses this conversion using an autoclave and temperatures of about 210° C. The same conversion, but now in the presence of potassium carbonate using temperatures between 180 and 210° C. and pressures between 16 and 20 atm., is disclosed in RO 100113.

In order to minimise operational costs and to maximize energy conservation, it would be desirable to conduct the hydrothermal conversion of iron oxides, iron hydroxides, and iron oxyhydroxides in a continuous mode. However, as will explained below, processes involving suspensions are not easy to conduct continuously, mainly due to segregation and sedimentation.

Suspensions consist of a continuous phase, i.e. a liquid, and a dispersed phase, i.e. solid particles. Suspensions can be homogeneous or heterogeneous. In this specification, homogeneous suspensions are defined as suspensions having a constant volume fraction of the continuous phase throughout the whole system. Suspensions without such a constant volume fraction of the continuous phase are referred to as heterogeneous. In these heterogeneous systems there are concentration gradients of the dispersed phase.

Suspensions can separate into a fraction with a higher volume fraction of the continuous phase and a fraction with a lower volume fraction of the continuous phase. Within this specification this phenomenon is referred to as segregation. Segregation can occur by the action of various forces, for instance centrifugal forces or gravity. Sedimentation is a form of segregation where the dispersed phase settles by gravity.

When a sediment is formed, part of the flow region within a reactor is blocked by a stagnant solid, reducing the volume available for free flow. With constant mass flux, the suspension will have to move through a smaller area, resulting in higher velocities of the continuous phase. This results in even more segregation and a non-ideal residence time distribution of the dispersed phase in the reactor.

The conversion of solid particles in a suspension can be performed continuously in traditional pipe reactors or cascade reactors, provided that the starting particles easily form a stable homogeneous suspension, e.g., a sol or a gel, and are of a more or less uniform particle size. Even then limitations in the Solids to Liquid Ratio (SLR) may occur due to the rheological behaviour of the homogeneous suspension. High energy input, e.g., high-shear mixing, can alleviate these difficulties if the suspensions exhibit shear-thinning behaviour.

Unfortunately, readily available iron oxides, iron hydroxides, and iron oxyhydroxides are not easily suspendable and/or do not form stable homogeneous suspensions, neither at high solids to liquid ratios nor at low ones. This is due either to their large particle size (say >0.1 micron) and/or to their chemical incompatibility with the liquid, making segregation of the particles from the liquid very likely. This means that the particles will show a tendency to form a sediment layer, resulting in an uncontrolled and non-ideal residence time distribution in the reactor, thereby hindering the conversion. This situation may be further aggravated when dealing with starting particles of different sizes.

Contrary to the case of the stable homogeneous suspensions described above, where high shear can assist in homogenization and reduction of the viscosity, unstable suspensions tend to segregate even faster when a high energy input is added to the system. Therefore, good mixing throughout the whole reactor and avoiding any dead or non-mixing zones is preferred to avoid non-ideal residence time distributions and to promote efficient conversion of the starting particles.

Alternatively, expensive chemicals need to be added in order to stabilize and disperse the suspension and to prevent segregation.

It has now been found that solid starting iron compounds selected from the group consisting of iron oxides, iron hydroxides, iron oxyhydroxides, and mixtures thereof can be converted continuously, even at high Solids to Liquid Ratios (SLR), in one or a series of separate vessels without an unacceptable level of segregation. Using high Solids to Liquid Ratios enables the use of relatively compact equipment and offers low operational costs and energy consumption.

SUMMARY OF THE INVENTION

The invention relates to a process for the conversion of a solid starting iron compound selected from the group consisting of iron oxides, iron hydroxides, iron oxyhydroxides, and mixtures thereof into a solid product iron compound, the solid product iron compound having different physical, chemical, and/or structural properties from the solid starting iron compound, which process comprises the steps of:

a) dispersing the solid starting iron compound in a liquid thus forming a suspension, and
b) feeding the suspension continuously though one or more agitated conversion vessel(s), in which vessel(s) the solid starting iron compound is converted into the solid product iron compound under hydrothermal conditions.

Other embodiments of the invention include reaction conditions, characteristics of the suspension, suspension flow and forms of iron, all of which will be hereinafter described in detail.

DETAILED DESCRIPTION OF THE INVENTION

Figure 1:
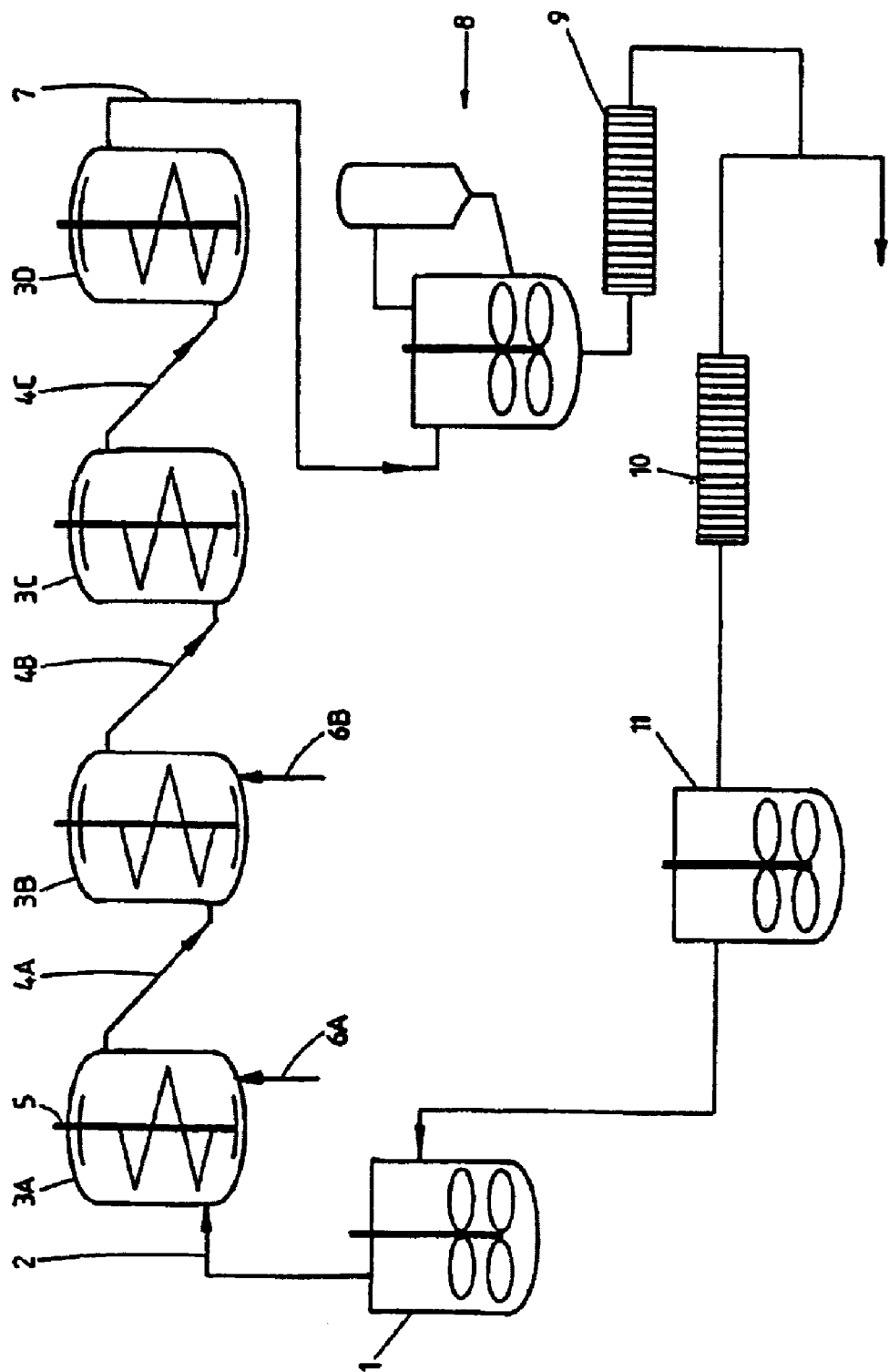
FIG. 1 shows a schematic layout of a plant for carrying out the present invention.

The invention relates to the conversion of one solid iron compound into another solid iron compound. It does not relate to, e.g., a precipitation process in which a dissolved iron compound is converted into a solid iron compound, or a digestion process in which a solid iron compound is dissolved.

The continuous process according to the invention preferably has a throughput of 0.01 to 10 l/min, more preferably 0.05–5 l/min, and most preferably 0.1–3 l/min.

In the continuous process according to the invention it is preferred that the suspension flows substantially upward through the vessel(s) and/or the mixer exerts axial forces on the suspension, such that the whole reactor is well-mixed and dead zones are avoided. With these measures, segregation of the solid particles and the liquid can be further suppressed. Also, an inhomogeneous distribution in the suspension of smaller particles on the one hand and larger particles on the other is substantially avoided.

As the invention relates to the conversion of one solid iron compound into another solid iron compound, the solids content of the suspension during step b) will be relatively constant, although it might change as a result of, e.g., (a) the conversion of an iron compound with a specific molecular weight into an iron compound with a higher or lower molecular weight, (b) the injection of steam (for heating purposes), which will decrease the solids content of the suspension, or c) the addition of additives to the suspension during the process, which may decrease or increase the solids content, depending on the additive.

Preferably, the solids content of the suspension (i.e. the weight percentage solids, including crystal water, based on the total weight of the suspension) at the end of step b) will deviate from the solids content of the suspension at the start of step b) by less than 40%, preferably less than 25%, more preferably less than 10%.

A further advantage of the present invention resides in the possibility of fine-tuning particular (aspects of) process steps. If more than one conversion vessel is used, particular properties of the solid product iron compound can be controlled and/or amplified by adapting, preferably optimizing, the process conditions in at least one of these vessels. Within the framework of the present invention, this technique or procedure is called "de-coupling." Hence, de-coupling means that in the series of conversion vessels the process conditions in one or more of the vessels differ from those in the other vessel or vessels.

This de-coupling of process stages can be used for, inter alia, effective control of the structure of the solid product iron compound. The advantage of de-coupling is not trivial: by de-coupling the various process steps it becomes possible for instance to optimize the mixing and handling of the solid-liquid suspension which can change in rheological behaviour during its conversion. Thus segregation, in the form of either sedimentation or separation of solids with different particle sizes, can be avoided even at high SLR.

Moreover, de-coupling allows for optimization of the conditions of multi-stage processes. For instance, the temperature or pH can be changed in each step and additional compounds, such as seeds or additives, can be added in any of the steps.

Suitable solid starting and product iron compounds include iron ores such as goethite (FeOOH), akaganeite, bernalite, feroxyhyte, ferrihydrite, lepidocrocite, limonite, maghemite, magnetite, hematite, and wustite, synthetic iron products such as synthetic iron oxides and hydroxides, and (freshly) precipitated iron salts (such as iron nitrate, iron chloride, etc). It is noted that if the starting and product iron compounds are chemically equal, they have to differ in terms of their structural and/or physical properties. Examples of such properties are surface area, pore volume, pore size distribution, catalytic activity, etc.

Examples of conversions which can be performed using the process according to the invention are the conversion of ferrihydrite into hemtite, the conversion of goethite into goethite with a higher crystallinity, the conversion of hematite with a specific porosity and surface area into hematite with another porosity and surface area.

It is also possible to convert an additive-containing solid starting iron compound into an additive-containing solid product iron compound using the process of the invention. Additive-containing solid starting iron compounds are solid iron compounds having another compound dispersed in their structure and can be prepared by, e.g., co-precipitating a soluble iron compound and a soluble compound of the desired additive. Examples of suitable additives to be dispersed in the iron compound are compounds comprising one or more elements selected from the group consisting of rare earth metals (e.g. La, Ce), transition metals (e.g. Cr, Cu, Re, Zn, V, Ni, Co, Mo, Mn, Zr, Ru), noble metals (e.g. Pt, Pd), alkali metals (e.g. Na, K), alkaline earth metals (e.g. Mg, Ca, Ba), Si, and Al.

The process according to the present invention can be conducted using one or more, preferably a series of two to five, more preferably three to five, separate and substantially vertical conversion vessel(s). The conversion vessel(s) (each) comprise(s) a dedicated means for agitating the suspension. Axial or coaxial mixers are preferred.

The plant for carrying out the present invention comprises a feed preparation vessel 1, to which the solid starting iron compound and optionally one or more additives are added and mixed with liquid to form a suspension. Suitable liquids include water, alcohols such as methanol, ethanol, n-propanol, isopropanol, etc., and hydrocarbon liquids such as toluene, hexane, white spirits, gasoline, etc., with water being preferred.

Suitable additives to be added to the suspension include elements selected from the group consisting of rare earth metals (e.g. La, Ce), transition metals (e.g. Cr, Cu, Re, Zn, V, Ni, Co, Mo, Mn, Ru, Zr, Ti), noble metals (e.g. Pt, Pd), alkali metals (e.g. Na, K), alkaline earth metals (e.g. Mg, Ca, Ba, Sr), Si, and Al. Preferred compounds are oxides, hydroxides, carbonates, and hydroxycarbonates, although salts such as chlorides, nitrates, sulfates, etc. can also be used. The desired additive depends on the intended use of the product iron compound.

Also acids (e.g. $HNO_3$) and bases (e.g. $H_2CO_3$, $NH_4HCO_3$) can be added to one or more of the conversion vessels during the process. The addition of an additive to the suspension—like the use of an additive-containing solid iron starting compound—may result in an additive-containing solid product iron compound, The amount of additive in this additive-containing solid product iron compound preferably is 0.1–15 wt %, more preferably 1–6 wt %, calculated as metal and based on the weight of the additive-containing solid product iron compound.

If desired, the solid iron starting particles and the optional additive may be milled, either before or after being dispersed in the liquid. Instruments that can be used for milling include ball mills, high-shear mixers, colloid mixers, kneaders, and electrical transducers that can introduce ultrasound waves into a slurry.

It should be noted that the solid iron product particles resulting from the process according to the invention can be milled using the same techniques, if so desired.

Forced by way of a feed pump, the suspension is led continuously through a duct 2 to an inlet of the first of one or more, but preferably three to five, conversion vessels. By way of example, FIG. 1 displays four such vessels: 3A–3D. Each of the vessels 3A–3D is provided with an outlet near its top, which is connected by means of a duct to an inlet near or in the bottom of a subsequent vessel, thus connecting the vessels 3A–3D in series. Each of the conversion vessels 3A–3D further contains an axial mixer 5, for instance a double-helix impeller or an anchor stirrer combined with an EKATO-INTERMIG® (an impeller suitable for mixing slurries with low viscosity, of which the outer blades pump downward while the inner blades pump upward), with which the suspension is both mixed substantially vertically and transported upward and downward while avoiding any dead or non-mixed zones. The mixers 5 are driven by electromotors (not shown) mounted on top of the conversion vessels 3A–3D. Typically, the mixers 5 are rotated at speeds from 20 to 500 revolutions per minute (rpm).

The conversion of the solid starting iron compound is conducted under hydrothermal conditions. Hydrothermal conditions are defined as a temperature above the boiling point of the liquid and a pressure above atmospheric, generally up to about 100 bar, preferably autogeneous pressure. Depending on the liquid and the temperature applied, the autogeneous pressure generally ranges from 1 to several tens of bars.

If water is used as the liquid, suitable temperatures range from 150° to 375° C., preferably 180°–350° C.

The pH can range from 0 to 14, preferably from 0.1 to 9. The pH can be adjusted by acids and bases, which can be added to each conversion vessel separately.

It is noted that if more than one conversion vessel is used, the temperature and pH in each of these vessels may differ, if so desired.

One or more additives (examples are listed above) can be added to the suspension in one or more of the conversion vessels. Alternatively, a part of the total amount of additive can be added to one of the conversion vessels, whereas another part can be added to another conversion vessel.

The addition of additive to the suspension during the process can be combined with the use of an additive-containing solid starting iron compound.

After conversion, the suspension containing the solid product iron compound particles leaves the last conversion vessel, e.g., the fourth vessel 3D, and is led through a duct 7 to a cooler unit 8, where the product is cooled down to, say, below 100° C. A mill 9 may be used to grind the particles. If desired, the milled suspension may be separated into a product fraction of, e.g., 90 wt % and a corresponding seeds fraction (10 wt %). The seeds fraction may be ground to particles having an average size of 0.3 to 0.5 micron in a further mill 10, which is connected to a seeds buffer tank 11, which in turn is connected to either the feed preparation vessel 1 or any one of the conversion vessels 3A–3D. By way of example, FIG. 1 displays its connection to the feed preparation vessel.

The Solids to Liquid Ratio (SLR) of the suspension is defined as the weight ratio of solids, including crystal water, to liquid in the suspension. The process according to the invention allows processing of suspensions having an SLR up to 1.5. The optimal SLR depends on the rheological behaviour of the suspension, e.g. the tendency to form a gel. The SLR at the start of step b) preferably is 0.01–1.5, more preferably 0.05–0.25, while the SLR at the end of step b) preferably is 0.01–1.5, more preferably 0.03–0.22.

If desired, the solid product iron compound formed in the present process may be shaped to form shaped bodies. In that case, it is preferred to continuously feed the suspension containing the solid product iron compound from cooler unit 8 or mill 9 to a shaping apparatus. Suitable shaping methods include spray-drying, pelletising, extrusion (optionally combined with kneading), beading, or any other conventional shaping method used in the catalyst and absorbent fields or combinations thereof. The amount of liquid present in the suspension used for shaping should be adapted to the specific shaping step to be conducted. It might be advisable to partially remove the liquid used in the suspension and/or to add an additional or another liquid and/or to change the pH of the precursor mixture to make the suspension gellable and thus suitable for shaping. Various additives commonly used in the different shaping methods, e.g. extrusion additives, may be added to the precursor mixture used for shaping.

If desired, the solid product iron compound may be calcined. Calcination is preferably performed at temperatures in the range of 150 to 1000° C., preferably 200 to 450° C., for 15 minutes to 5 hours, preferably 30 minutes to 3 hours.

The so-obtained solid product iron compound can suitably be used as or in a catalyst for, e.g., Fischer-Tropsch synthesis, ammonia synthesis, dehydrogenation of, e.g., ethylbenzene to styrene, fluid catalytic cracking (FCC), hydroprocessing (HPC), hydrocracking, hydrogenation reactions, etc. These solid product iron compounds can also suitably be used in the pigment industry.

EXAMPLES

Example 1

Iron hydroxide (prepared by precipitation of iron nitrate with NaOH) was suspended in water. The suspension had an SLR of 0.06 and a solids content of 6 wt %. This suspension was pumped continuously upward through one conversion vessel (3A) at a temperature of 190° C. (using steam injection) and autogeneous pressure. The suspension was vigorously agitated using a double-helix impeller at 76–83 rpm. The throughput was 0.3 l/min.

The suspension leaving the conversion vessel had an SLR of 0.05 and a solids content of 5 wt %. The color of the suspension had changed from brown at the start of the reaction to bright orange-red at the end.

The product iron compound was isolated by filtration and dried at 80° C. for further analysis. XRD and chemical analysis on the orange-red powder revealed the quantitative formation of iron oxide, i.e. hematite.

Example 2

The iron ore goethite (and iron oxyhydroxide) with a BET surface area of 94 $m^2$/g was suspended in water. The suspension had an SLR of 0.11 and a solids content of 10 wt %. This suspension was pumped continuously upward through one conversion vessel (3A) at a temperature of 190° C. and autogeneous pressure. The suspension was vigorously agitated using double-helix impeller at 76–83 rpm. The throughput was 0.3 l/min.

The suspension leaving the conversion vessel had an SLR of 0.11 and a solids content of 10 wt %.

The product iron compound was isolated by filtration and dried at 80° C. for further analysis. XRD and nitrogen adsorption-desorption measurements performed on the powder demonstrated a structural change: the porosity had decreased, while the crystallinity had increased. The BET surface area of the product material was 26 $m^2$/g.

Example 3

The product iron compound of Example 2 was calcined at 350° C. for 5 hours with a ramp of 10° C./min. A porous hematite was obtained.

Example 4

Goethite (trans-oxide yellow; Johnson Matthey) was suspended in water. The suspension had a solids content of 19 wt %. This suspension was pumped continuously through one conversion vessel (3A) at a temperature of 210° C. and autogeneous pressure. The suspension was vigorously agitated using a double helix impeller at 76–83 rpm. The throughput was 0.3 l/min.

The suspension leaving the conversion vessel had a solid content of 19 wt %.

The product iron compound was isolated by filtration and dried at 80° C. for further analysis. XRD revealed the partial formation of hematite.

Example 5

Goethite (trans-oxide yellow; Johnson Matthey) was suspended in water. The suspension had a solids content of 19 wt %. This suspension was pumped continuously through one conversion vessel (3A) at a temperature of 290° C. and autogeneous pressure. The suspension was vigorously agitated using a double helix impeller at 76–83 rpm. The throughput was 0.3 l/min.

The suspension leaving the conversion vessel had a solid content of 18 wt %. The product iron compound was isolated by filtration and dried at 80° C. for further analysis. XRD revealed the quantitative formation of hematite.

Example 6

Hematite (trans-oxide red; Johnson Matthey) with a BET surface area of 84 $m^2$/g was suspended in water. The suspension had a solids content of 6 wt %. This suspension was pumped continuously through one conversion vessel (3A) at a temperature of 200° C. and autogeneous pressure. The suspension was vigorously agitated using a double helix impeller at 76–83 rpm. The throughput was 0.3 l/min. The suspension leaving the conversion vessel had a solid content of 6 wt %. The product iron compound was isolated by filtration and dried at 80° C. for further analysis. XRD and nitrogen adsorption-desorption measurements showed that the resulting product had a higher crystallinity and smaller BET-surface area (39 $m^2$/g) than the starting material.

Example 7

A Zn-containing iron hydroxide was prepared by precipitating iron nitrate with $NH_4OH$ in the presence of zinc nitrate. Calculated as oxides ($Fe_2O_3$ and ZnO), the iron hydroxide comprised 4 wt % Zn.

The Zn-containing iron hydroxide was suspended in water (SLR 0.18; solids content 15 wt %) and pumped to the first conversion vessel (3A) and continuously fed through the following two conversion vessels (3B–3C). The throughput was 0.3 l/min.

The conversion vessels were all heated at 200° C. using steam injection; the pressure was autogenous. The suspension in all conversion vessels was agitated using a double-helix impeller at 76–83 rpm.

The suspension leaving the last conversion vessel (3C) had an SLR of 0.14 and a solids content of 12 wt %.

The product iron compound was isolated by filtration and dried at 80° C. for further analysis. XRD and chemical analysis on the product revealed the formation of Zn-containing iron oxyhydroxide.

Example 8

Example 7 was repeated, except that an iron hydroxide containing 4 wt % Cu was used (calculated as oxides and prepared by precipitation of iron nitrate and Cu nitrate). The resulting product was a Cu-containing iron oxyhydroxide.

Example 9

Example 7 was repeated, except that an iron hydroxide containing 3 wt % Zn and 3 wt % Cu was used (calculated as oxides). The resulting product was a Zn and Cu-containing iron oxyhydroxide.

Example 10

Example 7 was repeated, except that an iron hydroxide containing 3 wt % Co was used (calculated as oxides and prepared by precipitation of iron nitrate and Co nitrate). The resulting product was a Co-containing iron oxyhydroxide.

Example 11

Example 7 was repeated, except that an iron hydroxide containing 6 wt % Ce was used (calculated as oxides and prepared by precipitation of iron nitrate and Ce nitrate). The resulting product was a Ce-containing iron oxyhydroxide.

Example 12

Example 7 was repeated, except that an iron hydroxide containing 5 wt % La was used (calculated as oxides and prepared by precipitation of iron nitrate and La nitrate). The resulting product was a La-containing iron oxyhydroxide.

The invention claimed is:

1. A continuous process comprising the steps of:
   forming a suspension by dispersing a solid starting iron compound in a liquid;
   continuously feeding the suspension through two or more agitated conversion vessels under hydrothermal conditions wherein the operating conditions in at least one of the conversion vessels is different from the other conversion vessels;
   converting the solid starting iron compound into a solid product iron compound, having different physical, chemical, or structural properties from the solid starting iron compound, in the two or more agitated conversion vessels; and
   continuously removing the solid product iron compound from the last of the two or more conversion vessels.

2. The process of claim 1, wherein the solid starting iron compound is selected from the group consisting of iron oxides, iron hydroxide, iron oxyhydroxides, and mixtures thereof.

3. The process of claim 2, wherein the solid starting iron compound is an iron ore, a synthetic iron product, or a precipitated iron salt.

4. The process of claim 3, wherein the solid starting iron compound is an iron ore selected from the group consisting of goethite, akaganeite, bernalite, feroxyhyte, ferrihydrite, lepidocrocite, limonite, maghemite, magnetite, hematite, and wustite.

5. The process of claim 1 wherein an additive-containing solid starting iron compound is used.

6. The process of claim 1, wherein the suspension flows substantially upward through the one or more conversion vessels.

7. The process of claim 1, wherein from two to five conversion vessels are employed.

8. The process of claim 1, wherein the pH in at least one of the conversion vessels is different from the other conversion vessels.

9. The process of claim 1, wherein an additive is added to at least one of the conversion vessels.

10. The process of claim 1, wherein seeds are added to at least one of the conversion vessels.

11. The process of claim 1 further comprising a feed preparation vessel wherein the suspension is prepared.

12. The process of claim 11, wherein the liquid is water.

13. The process of claim 11, wherein the liquid is an alcohol.

14. The process of claim 11, wherein the liquid is a hydrocarbon.

15. The process of claim 11, wherein at least one additive is added to the suspension.

16. The process of claim 15, wherein the additive includes a rare earth metal, a transition metal, a noble metal, and alkali metal, or an alkaline earth metal.

17. The process of claim 16, wherein the additive is an oxide, hydroxide, carbonate, or hydroxycarbonate.

18. The process of claim 11, wherein the temperature in the one or more conversion vessels ranges from 150 to 375° C.

19. The process of claim 1 wherein the solids to liquid ratio of the suspension entering the one or more conversion vessels ranges from 0.05:1 to 0.25:1.

20. The process of claim 19, wherein the solids to liquid ratio of the suspension exiting the last of the two or more conversion vessels ranges from 0.03:1 to 0.22:1.

21. The process of claim 1, wherein the solids content of the suspension entering the two or more conversion vessels deviates from the solids content of the suspension exiting the last of the two or more conversion vessels by less than 40 wt%.

22. The process of claim 21, wherein the solids content of the suspension entering the two or more conversion vessels deviates from the solids content of the suspension exiting the last of the two or more conversion vessels by less than 25 wt%.

23. The process of claim 22, wherein the solids content of the suspension entering the one or more conversion vessels deviates from the solids, content of the suspension exiting the last of the two or more conversion vessels by less than 10 wt%.

* * * * *